United States Patent [19]
Smith, Jr. et al.

[11] 3,934,796
[45] Jan. 27, 1976

[54] HEATING SYSTEM WITH FUEL SAVING DRAFT RETARDER

[76] Inventors: Paul E. Smith, Jr., Box 133A, Rte. No. 1; Lloyd D. Chilcott, Box 95, Rte. No. 1, both of Mays Landing, N.J. 08330

[22] Filed: Feb. 14, 1974

[21] Appl. No.: 442,626

Related U.S. Application Data

[63] Continuation-in-part of Ser. No. 417,181, Nov. 29, 1973, abandoned.

[52] U.S. Cl. ............... 236/16; 126/285.5; 251/48; 251/138; 431/20
[51] Int. Cl.² ........................................ G05D 23/00
[58] Field of Search ...... 431/20; 126/285.5; 236/49, 236/16; 251/48, 129, 138; 200/34

[56] References Cited
UNITED STATES PATENTS

| | | | |
|---|---|---|---|
| 1,875,616 | 9/1932 | Kohout | 126/285.5 |
| 2,698,140 | 12/1954 | Buehler | 431/20 |
| 2,856,992 | 10/1958 | Bartels | 236/1 |
| 3,010,451 | 11/1961 | Hodgins | 431/20 |
| 3,081,847 | 3/1963 | Smitley | 200/34 X |
| 3,788,795 | 1/1974 | Zeitlin | 431/20 |

Primary Examiner—William E. Wayner
Assistant Examiner—William E. Tapolcai, Jr.
Attorney, Agent, or Firm—O'Brien & Marks

[57] ABSTRACT

A damper, normally biased closed, in a flue of a heating system has an arm which is connected by linkage to an armature of a solenoid for opening the damper when a winding of the solenoid is energized by a heating system control. Switch means, engaged by the arm, is interposed between the heating system control and burner facilities of the heating system for preventing operation of the burner facilities when the damper is closed and for allowing operation of the burner facilities when the damper is open.

8 Claims, 7 Drawing Figures

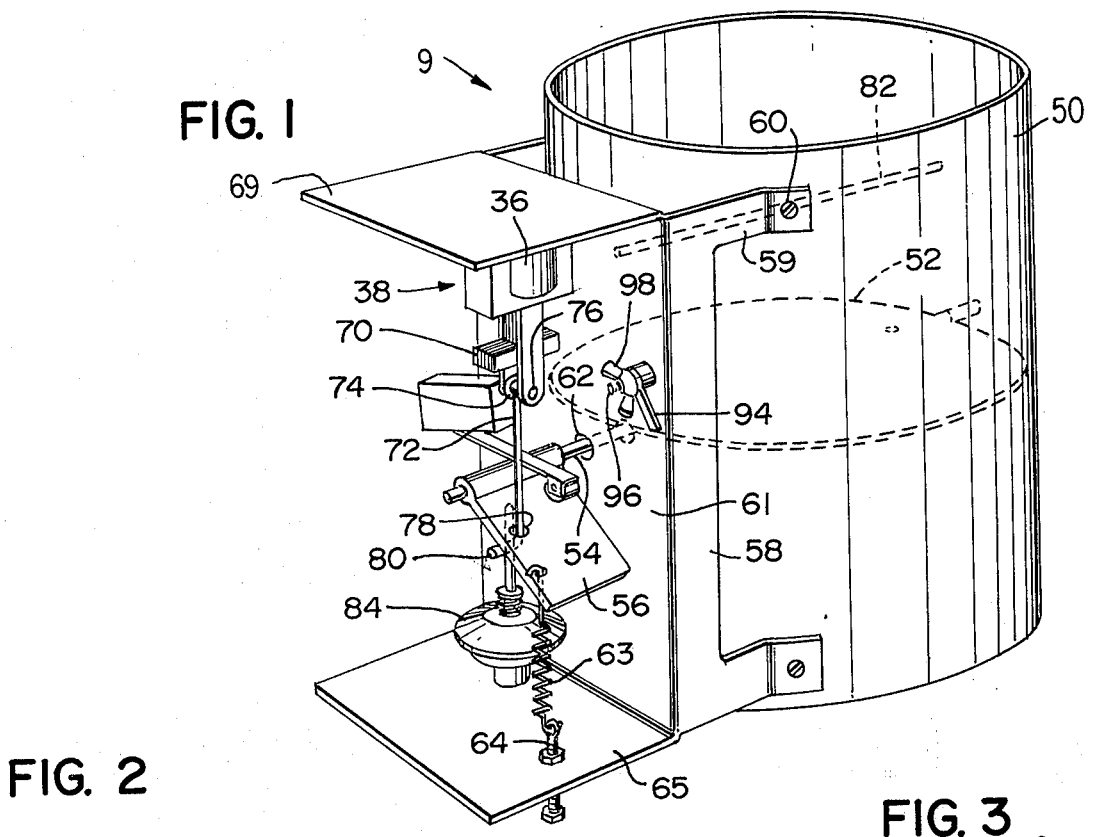
FIG. 1
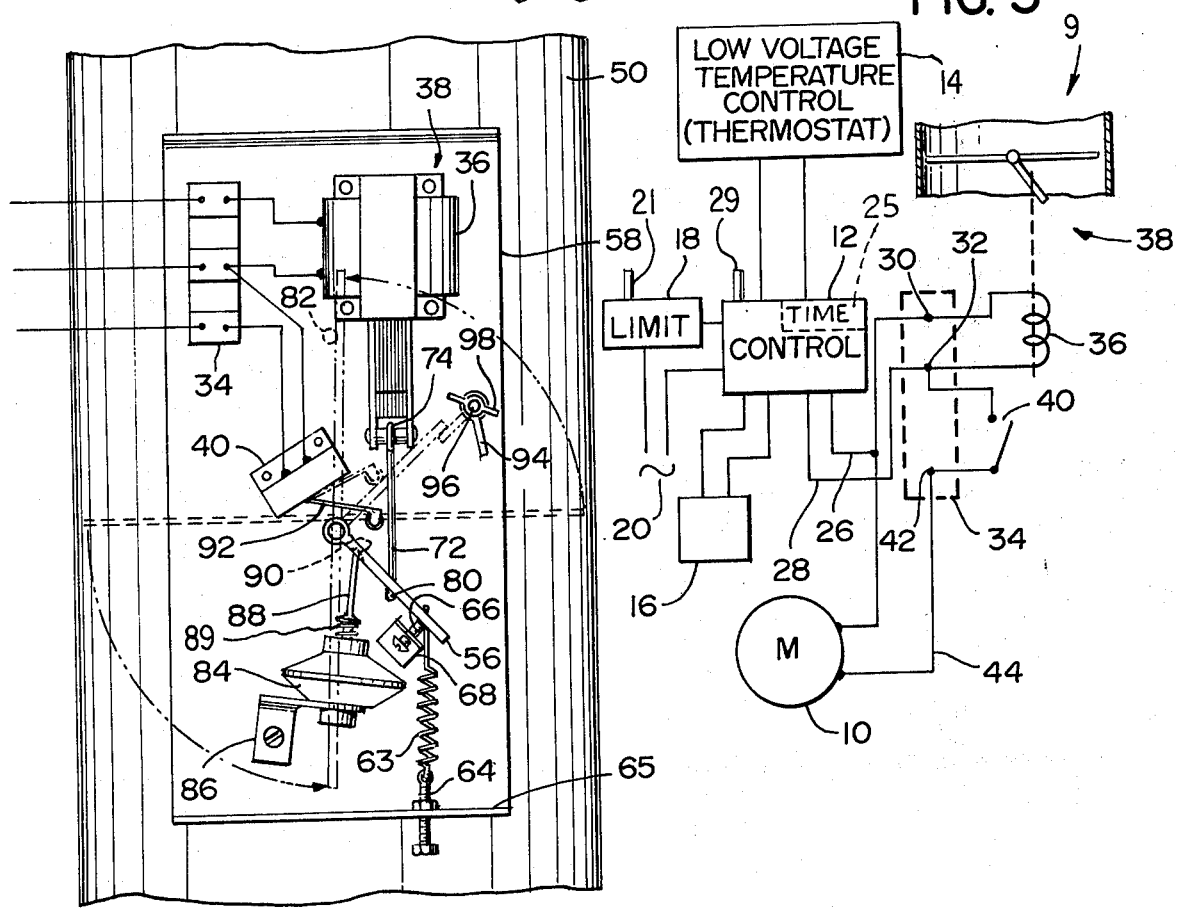
FIG. 2
FIG. 3

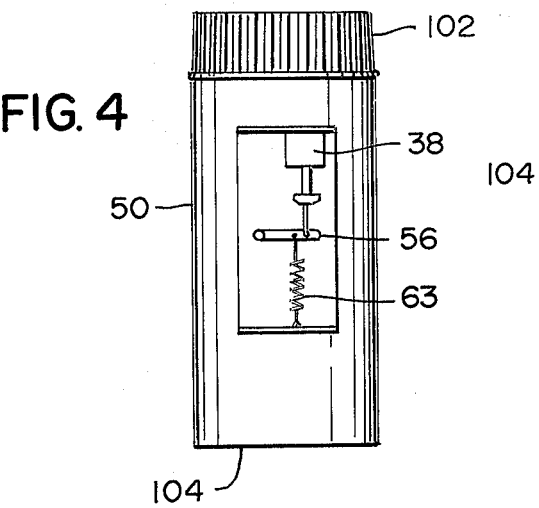
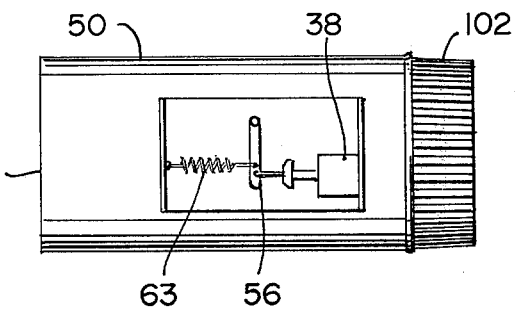
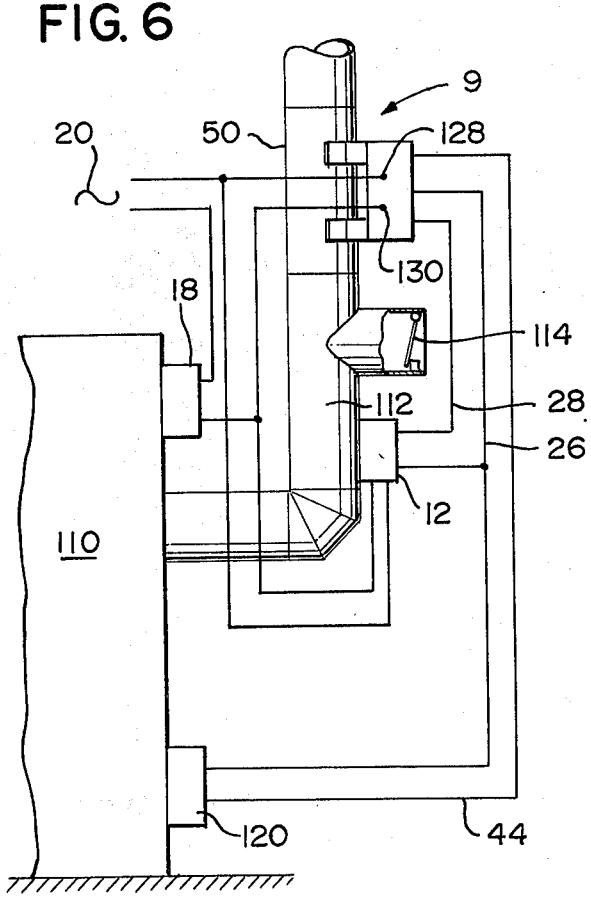
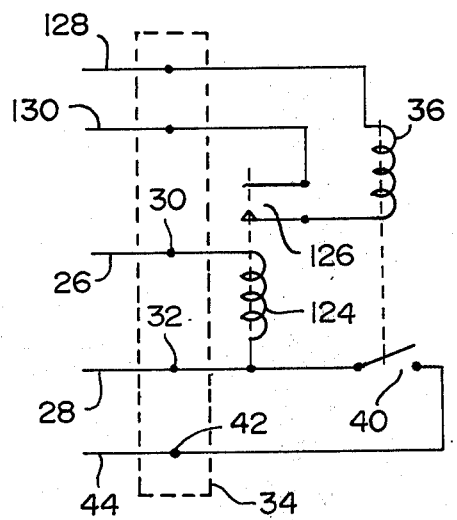

3,934,796

HEATING SYSTEM WITH FUEL SAVING DRAFT RETARDER

CROSS REFERENCE TO RELATED APPLICATION

This application is a continuation-in-part of our application Ser. No. 417,181 filed Nov. 29, 1973, now abandoned, for ELECTROMATIC FUEL SAVING DRAFT RETARDER which is incorporated herein by reference.

BACKGROUND OF THE INVENTION

1. Field of the invention

This invention relates to automatically operated closures for flues or ducts in heating systems, and in particular, to a draft closure for flues of the type found in oil or gas fired heating systems and the like.

2. Description of the Prior Art

The prior art, as exemplified by U.S. Pat. Nos. 2,165,488, 2,224,705, 2,633,299, 2,856,992, 3,010,451, and 3,090,558, contains a number of automatically operated damper systems for exhaust stacks in heating systems. The prior art automatically operated damper systems can generally be characterized as having one of more deficiencies, such as being unduly complex, too expensive in requiring unnecessary components, and not being fail-safe; fail-safe being defined as preventing burner operation in the event of failure of the damper to open.

Additionally, prior art heating systems employing automatically operated dampers have generally not been fail-safe and/or not capable of obtaining optimum fuel savings.

SUMMARY OF THE INVENTION

The invention is summarized in a fuel saving draft retarder for a heating system including a flue section, a damper mounted in the flue section, a support on the flue section, an arm on the damper rotatable in front of the support for opening and closing the damper, a solenoid mounted on the support and having an armature and a heating system energizable winding, linkage means connecting the solenoid to the arm for rotating the arm to open the damper when the winding is energized, means for biasing the damper closed, heating system switch means mounted on the support for being engaged and operated by the arm when the damper is open, a dashpot having an operating rod and spring means normally biasing the operating rod in an extended position, and means for mounting the dashpot on the support such that the operating rod is engaged and depressed by the arm when the arm is rotated to close the damper.

An object of the invention is to construct a relatively simple, reliable and fail-safe automatically operated draft retarder for a heating system.

Another object of the invention is to utilize an arm on a damper for several functions.

It is also an object of the invention to produce an automatic damper control that works in conjunction with present safety controls of burner systems without compromising their normal functions.

Still another object of the invention is to construct a burner system which optimizes heat transfer from fuel combustion while preventing unnecessary loss of heat from a heated area.

One advantage of the invention is that the automatic damper control is provided with manual locking facilities for holding the damper in an open position in the event automatic facilities become defective.

Another advantage of the invention is that it can be readily modified to be incorporated in a heating duct of a heating system to provide for different temperatures in different heated or unheated areas.

It is also an advantage of the invention that commonly available components are employed in a relatively simple arrangement that allows the components to be readily replaced and repaired.

Other features of the invention include the provision of a rod with a head connecting an armature to an arm on a damper such that the rod slides in one direction relative to the arm and the head engages the arm to move the arm when the rod is moved in the opposite direction; the provision of a limit and flutter stop for a damper; the provision of an adjustable tension device for biasing a damper closed; and the provision of an adjustable open stop for the damper.

Other objects, advantages and features of the invention will become apparent from the following description taken in conjunction with the accompanying drawings.

BRIEF DESCRIPTION OF THE DRAWING

FIG. 1 is a detail perspective view taken from the upper right of a draft retarder device constructed in accordance with the invention.

FIG. 2 is a detail front elevation view of the device of FIG. 1.

FIG. 3 is a diagram of a heating system incorporating the device of FIGS. 1 and 2 in accordance with the invention.

FIG. 4 is a front elevation view of the draft retarder device in a first orientation.

FIG. 5 is a front elevation view of the draft retarder device in a second orientation.

FIG. 6 is a diagram of a modified heating system in accordance with the invention.

FIG. 7 is a diagram of a portion of the electrical circuitry for the modified heating system of FIG. 6.

DESCRIPTION OF THE PREFERRED EMBODIMENTS

As illustrated in FIG. 3, the invention is embodied in a heating system including a draft retarder, indicated generally at 9, and burner means, such as a motor driven oil burner 10, operated by control facilities including a primary burner control 12, a low voltage temperature control such as a thermostat 14, ignition means 16, and a high temperature limit switch 18. Power is supplied from a suitable power source 20 to electrical lines connected serially through the limit switch 18 to the primary burner control 12. The limit switch 18 is a conventional normally closed limit switch such as a temperature responsive switch having a temperature sensing element 21 mounted in a bonnet or stack of a heating system to sense a high temperature condition and open the switch to terminate operation of the heating system. The control 12 is a conventional primary burner control for energizing the igniter means 16 and electrical lines 26 and 28 in response to operation of the low voltage control 14. Also, the control 12 includes a timing circuit 25 for deenergizing the lines 26 and 28 unless a combustion sensing element 29 mounted in the stack or burner chamber of the heating system senses a rise in temperature or radiant energy corresponding to combustion within a predetermined duration after the initiation of a cycle by the operation of the thermostat 14. In conventional heating systems, the lines 26 and 28 are connected directly to the burner means 10 for operating the burner means. The ignition means 16 may be any conventional ignition means employed in burner systems, such as a high voltage spark transformer.

In the heating system of FIG. 3, the lines 26 and 28 from the primary burner control 12 are connected to respective terminals 30 and 32 of a terminal block 34. Terminals 30 and 32 are connected across a winding 36 of a solenoid indicated generally at 38. The terminal 32 is connected to one side of a normally open switch 40 which has its other side connected to a terminal 42 of the terminal block 34. A line 44 is connected between the terminal 42 and one input terminal of the burner means 10 while the line 26 is connected to a second input terminal of the burner means 10.

As shown in FIGS. 1 and 2, the automatic damper device 9 includes a section 50 of a flue or conduit, such as an exhaust flue for the heating system. A damper including a plate 52 mounted on a shaft 54 is rotatably mounted within the flue section 50. An arm 56 is mounted on one end of the shaft 54 for rotating the shaft 54 and the plate 52 to open and close the damper. The solenoid 38 is suitably mounted on a support 58 having legs 59 secured by weld or screws 60 to flue section 50 to hold the support in a spaced relationship from the flue section 50 allowing ventilation between the flue section 50 and support 58 to prevent excessive heating of the solenoid 38 and other electrical components of the draft retarder. The one end of the shaft 54 extends outside of the flue section 50 through a bearing 62 in the support 58 with the arm 56 extending perpendicular to the axis of rotation of the shaft 54 for pivotal movement in a vertical plane spaced parallel in front of a vertical face 61 of the support 58. A tension spring 63 is secured at one end to the arm 56 and at its other end to an end of a screw 64 which is threaded in a lower extension 65 of the support 58 normally urge the arm 56 into engagement with the end of a screw 66 in a bracket 68 on the support 58. The screw 66 is adjusted to form a stop for the arm 56 to set the closed position of the damper. The lower extension 65 and an upper extension 69 are capable of supporting a cover to enclose the elements mounted on the support 58.

An upward retractable armature 70 of the solenoid 38 is aligned vertically above the arm 56. Linkage, means, such as a vertical rod 72 having an upper end formed with an eyelet 74, is secured to the armature 70 by a pin 76 passing through the eyelet 74 between bifurcated downward extending prongs of the armature 70. The rod 72 extends through an opening 78 in the arm 56 and has a head, such as a bent lower end 80, for engaging the bottom of the arm 56 to pull the arm upwards when the armature 70 is raised. The length of the rod 72 and the spacing of the opening 78 from the shaft 54 are selected to move the arm 56 through a ninety-degree angle of rotation about the shaft 54 when the armature 70 is raised, as shown in phantom in FIG. 2.

A bar 82 secured in the flue section 50 parallel to the shaft 54 is spaced from the shaft 54 to be engaged by the plate 52 and form a stop for the damper in the open position. The bar 82 may have a sleeve of resilient heat resistant material, such as TEFLON, mounted thereon to reduce noise when the plate 52 engages the bar 82. A dashpot 84 secured by a bracket 86 to the support 58 has a projecting rod 88 which is biased by a spring 89 in the extending position for engaging the bottom of the arm 56 within a recess 90 formed in the arm 56. The dashpot 84 is designed to slow the downward movement of the arm 56 sufficiently to allow gases to escape through the flue 50 at the termination of a burning cycle. The dash-pot 84 is positioned so that the end of the rod 88 only engages the arm 56 when the arm is in a lower portion of its arcuate movement, to disengage the arm 56 from the rod 88 when the arm is in an upper portion of its movement.

The switch 40 is mounted on the support 58 and has a resilient downwardly biased arm 92 which extends above the arm 56 to be engaged by the upper surface of the arm 56 when the arm 56 is in the raised position. The positioning of the switch 40 on the support is selected to have the arm 56 operate the switch 40 when the arm 56 is in its raised position, as shown in phantom in FIG. 2. The terminal block 34 is also suitably secured to the support 58.

A locking arm 94 is secured by a stud 96 and a wing nut 98 to the support 58. The stud 96 and the locking arm 94 are positioned such that the locking arm 94 may be positioned, as shown in phantom in FIG. 2, and secured by the wing nut 98 to hold the arm 56 in the raised position.

As illustrated in FIGS. 4 and 5, the flue section 50 has an end 102 which is pleated to reduce its cross section and form a male mating member. The end 102 on the flue section 50 is designed to prevent the flue section 50 from being installed in an orientation where the end 102 is lower than the opposite female mating end 104, since male mating ends of sections of exhaust flues are mounted in a direction away from the burner and toward the chimney.

In operation of the burner system shown in FIG. 3, the draft retarder 9 opens the damper plate 52 when the burner means 10 is operated to allow the combustion products from the burner means 10 to pass to the chimney. The draft retarder 9 closes the damper plate 52 when the operation of the burner means 10 is terminated to retard the draft of warm air through the exhaust flue. In heating systems, thhe retarding of the flow of warm air through an exhaust flue when the heating systems are not in operation substantially lessens the draft of cold outside air through window and door cracks resulting in a saving of fuel consumption which can be as high as 30%. The energy consumed by the draft retarder is substantially less than the energy saved by automatically closing the exhaust flue.

The low voltage temperature control 14 in response to the sensing of a temperature below a selected temperature operates the control circuit 12 which in turn energizes the ignition means 16 and the lines 26 and 28. The solenoid winding 36 is energized by the current in lines 26 and 28 to raise the armature 70 and rod 72, FIGS. 2 and 3, to engage the head 80 of the rod 72 against the bottom of the arm 56. The upward movement of the rod 72 rotates the arm 56, shaft 54 and plate 52 until the plate 52 engages the bar 82 to open the damper. The force of the solenoid 38 urging the plate 52 against the stop 82 internal the flue section prevents flutter of the plate 52 which could occur due to the elasticity of the shaft 54 and plate 52 if an open stop external to the flue 50 were employed.

When the arm 56 reaches its raised position, the arm 56 engages the switch arm 92 to close the switch 40 between the lines 28 and 44 energizing the burner means 10 causing the operation thereof.

When the low voltage temperature control 14 senses a temperature above the selected temperature, the control circuit 12 deenergizes the lines 26 and 28 and the winding 36. Ther armature 70 under the weight of gravity is allowed to drop slipping the rod 72 in the hold 78 and disengaging the end 80 from the arm 56. The arm 56, shaft 54 and plate 52 are rotated under the force of the spring 63 downward until the arm 56 engages the screw 66 to close the damper. The rod 88 from the dashpot 90 engaging the bottom of the arm 56 retards the closing movement of the damper which allows the flue gases formed at the end of the burning cycle sufficient time to be exhausted past the plate 52.

The rod 88 engages only the bottom of the arm 56 and does not retard upward movement of the arm 56 to allow rapid opening of the damper. The draft retarder does not interfere with normal functioning of the heating system in that the damper opens quickly upon initiation of the energization of lines 26 and 28 and allows substantially the normal period of operation of the burner means 10 prior to operation of the timing circuit of the primary burner control 12 to terminate heating system operation. If the opening of the damper were retarded, the timing circuit of the control 12 might operate before the switch 40 is operated and combustion is established.

The closed position is determined by the adjustment of the screw 66. Having the damper slightly open in the closed position is often required, for example where a continuous pilot burner is employed in a gaseous fuel heating system. The screw 66 allows the closed position of the damper to be set to optimize draft retardation as well as to meet requirements.

The utilizing of the arm 56 of the damper for a number of functions including engagement by the end 80 of the rod 72 from the solenoid 38 and engagement by the switch arm 92 results in a relatively simple structure which can be constructed at a low cost. Additionally, it is noted that the arm 56 is utilized also to engage the dashpot rod 88 and the stop screw 66. Further, the arm 56 can be engaged in the open position by the locking arm 94 to hold the plate 52 in an open position thus allowing operation of the heating system without automatic operation of the draft retarder.

Having the rod 72 slidable in the opening 78 prevents the weight of the armature 70 from substantially effecting the closing movement and hence duration of closing of the damper; the closing duration is dependent mainly upon the spring 63 and the dashpot 84 allowing these components to be relatively small and inexpensive. The effect of frictional forces of the armature 70 in the solenoid 38 when the retarder is mounted in the horizontal position of FIG. 5 is minimal when compared to the weight of the armature 70. Further, having the solenoid 38 positioned so that the spring 63 does not have to lift the weight of the armature 70 tends to prevent chatter of the solenoid 38. Since the spring 63 does not have to lift the armature 70, it can be relatively light and inexpensive; also, the solenoid 38 and armature 70 do not have to be large to overcome the force of the spring 63 sufficiently to prevent chatter. Where springs are required to lift armatures, chatter often occurs due to the large spring required thus urging the armature open with greater force requiring a larger, i.e. heavier, armature.

The use of the spring 63 for biasing the damper normally closed and the arm 56 secured to the shaft 54 of the damper for engaging the switch 40 in the burner system results in fail-safe features. The burner means 10 cannot be actuated or energized unless the damper is in the open position engaging the switch arm 92 of the switch 40. In the event there is a failure of the solenoid 38 or the linkage means 72 between the arm 56 and the solenoid armature 70, the switch 40 will not be operated resulting in a fail-safe system.

One particular advantage of the heating system employing the draft retarder 9 is that the dashpot 88 is positioned so as not to urge the arm 56 operating the switch 40. In the event both the spring 63 and the solenoid 38 or rod 72 fail, the resilient nature of the switch arm 92 will hold the arm 56 away from operating the switch 40 preventing the heating system from operating, and thus warning the user of a defective condition.

A modified heating system, shown in FIGS. 6 and 7, has parts identified by the same reference numerals used to identify parts of the heating system shown in FIGS. 1-5; such commonly identified parts having substantially similar structure and/or function. A heating unit or furnace 110 has an exhaust stack or flue 112 with a one-way valve means 114 for drawing room air when the exhaust flue is drawing combustion products from the heating unit 110. The one-way valve means 114 may be a conventional gravity closed valve with a valve member opened by suction in the flue 112 to allow the combustion products to remain in the unit 110 for an adequate duration and provide an efficient heat exchange. The automatic damper device 9 is installed past, i.e., between the chimney and the one-way valve means to retard the exit of room air when the unit 110 is not operating. The primary burner control 12 is mounted on the stack and senses stack temperature.

Also, the unit 110 is illustrated as a gas fired heating unit and includes a gas control 120 connected to the lines 26 and 44. In gas fired heating systems, the lines 26 and 28 from the primary burner control 12 may be energized by a low voltage and low power transformer. In the damper device 9 of FIGS. 6 and 7, the terminals 30 and 32 are connected across a low power relay coil 124 of a relay having normally open contacts 126 in series with the solenoid winding 36 and lines 128 and 130 in series with the limit switch 18 to the source 20.

The particular combination including the draft retarder device 9 past the one-way air intake valve means 114 provides optimum efficiency in the operation of the heating system and utilization of fuel by both maximizing heating transfer from combustion and retarding the loss of room air through the exhaust flue during periods that the heating system is not in operation.

One particular fail-safe feature of the heating system of FIG. 6 results from the cooperation of the primary burner control 12 and the draft retarder 9. In the event the switch 40 becomes frozen or stuck in the closed position and the solenoid 38 or linkage 72 should fail, the damper blocks the exhaust flue preventing the intake of fresh air in the unit 110 which results in the early extinguishment of the burner flames and the operation of the timing circuit by the stack temperature sensor of the primary burner control 12 to terminate operation of the heating system.

A modification of the draft retarder shown in the incorporated application Ser. No. 417,181 has a chain used for the linkage means 72 and includes a balance weight on the plate of the damper.

Since many modifications, variations and changes in detail may be made to the present embodiment, it is intended that all matter contained in the foregoing description or shown in the accompanying drawings be interpreted as illustrative and not in a limiting sense.

What is claimed is:

1. A fuel saving draft retarder for a heating system comprising
   a flue section;
   a damper mounted in the flue section;
   a support on the flue section;
   an arm on the damper rotatable in front of the support for opening and closing the damper;
   a solenoid mounted on the support and having an armature and a heating system energizable winding;
   linkage means connecting the solenoid to the arm for rotating the arm to open the damper when the winding is energized;
   means for biasing the damper closed;
   heating system control switch means mounted on the support for being engaged and operated by the arm when the damper is open;
   a dashpot having an operating rod and spring means normally biasing the operating rod in an extended position;
   means for mounting the dashpot on the support such that the operating rod is engaged and depressed by the arm when the arm is rotated to close the damper;
   said linkage means including a rod, an eyelet on one end of the rod, a pin pivotally securing the eyelet to the armature of the solenoid, and head means on the other end of the rod; and
   said arm having an opening slidably receiving the rod such that the head means engages the arm to rotate the arm to open the damper.

2. A fuel saving draft retarder as claimed in claim 1 wherein
   the biasing means includes a tension spring having one end connected to the arm and having the other end connected to the support.

3. A fuel saving draft retarder as claimed in claim 2 wherein
   there is provided means for adjusting the tension of the tension spring.

4. A heating system including
   means for burning fuel,
   fuel control means responsive to electrical energization for controlling a flow of fuel to the burning means,
   said burning means including an exhaust stack for combustion products of the burning means,
   a one-way air intake valve means for drawing air into the exhaust stack when a draft is being pulled in the exhaust stack and for closing when stack pressure exceeds room pressure,
   damper means in the stack past the one-way air intake valve means for opening and closing the stack,
   thermostat means for sensing temperature,
   primary burner electrical control means operated by the thermostat means for energizing the fuel control means when the sensed temperature is below a selected temperature and for deenergizing the fuel control means when the sensed temperature is above the selected temperature,
   means responsive to the primary burner control means for opening the damper means when the primary burner control means is energized and for closing the damper means when the primary burner control means is deenergized, and
   switch means operated by the damper opening and closing means and interposed between the primary burner control means and fuel control means for allowing operation of the fuel control means only when the damper means is open.

5. A heating system as claimed in claim 4 wherein
   the primary burner control means includes combustion sensing means and timing means operated in the absence of a sensed combustion temperature corresponding to burner operation for terminating the operation of the primary burner control means after a predetermined duration.

6. A heating system as claimed in claim 5 wherein
   the combustion temperature sensing means is a stack temperature sensing means.

7. A heating system as claimed in claim 4 wherein the means for opening and closing the damper means includes
   a damper in the exhaust stack,
   a support on the exhaust stack,
   an arm on the damper rotatable in front of the support for opening and closing the damper,
   a solenoid mounted on the support and having an armature and a winding which is coupled to the primary burner control means,
   a rod,
   an eyelet on one end of the rod,
   a pin pivotally mounting the eyelet to the armature,
   head means on the other end of the rod,
   said arm having an opening slidably receiving the rod such that the head means engages the arm to rotate the arm to open the damper,
   an adjustable stop on the support for engaging the arm to determine the open position of the damper,
   a tension spring connected at one end to the arm and at the other end to the support for biasing the arm against the adjustable stop,
   a dashpot having an operating rod and a compression spring normally biasing the operating rod in an extended position,
   means for mounting the dashpot on the support such that the operating rod is engaged and depressed by the arm when the arm is rotated to close the damper, and
   means for securing the damper in an open position.

8. A heating system as claimed in claim 7 wherein
   the damper includes a shaft rotatable mounted in the exhaust stack and a plate mounted on the shaft, and
   there is included a stop in the exhaust flue for engaging the plate to determine the open position of the damper and to prevent flutter of the plate.

* * * * *